United States Patent
Curic et al.

(10) Patent No.: US 12,160,341 B1
(45) Date of Patent: Dec. 3, 2024

(54) COORDINATION OF EDGE COMPUTING IN A MOBILE NETWORK

(71) Applicant: INTERNATIONAL BUSINESS MACHINES CORPORATION, Armonk, NY (US)

(72) Inventors: Maja Curic, Munich (DE); Sagar Tayal, Ambala (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/487,253

(22) Filed: Oct. 16, 2023

(51) Int. Cl.
 *H04L 41/0816* (2022.01)
 *H04L 41/5019* (2022.01)

(52) U.S. Cl.
 CPC ...... *H04L 41/0816* (2013.01); *H04L 41/5019* (2013.01)

(58) Field of Classification Search
 CPC ..... G06F 8/60; H04L 41/145; H04L 41/0806; H04L 41/0895; H04L 41/5009; H04L 43/0852; H04L 43/0876; H04L 41/0896; H04L 41/0823; H04L 41/0816; H04L 41/5019; H04W 16/18
 See application file for complete search history.

(56) References Cited

U.S. PATENT DOCUMENTS

| | | | |
|---|---|---|---|
| 10,897,493 B2 | 1/2021 | Yang | |
| 11,258,873 B2 | 2/2022 | Mueck | |
| 11,265,292 B1 * | 3/2022 | Leviseur | ............. H04L 63/0263 |
| 2018/0351824 A1 | 12/2018 | Giust | |

(Continued)

FOREIGN PATENT DOCUMENTS

DE 102021102855 B4 8/2022

OTHER PUBLICATIONS

ETSI, Mobile Edge Computing (MEC); Deployment of Mobile Edge Computing in an NFV environment, https://www.etsi.org/standards-search, 2018, 32 Pages.

(Continued)

*Primary Examiner* — Soe Hlaing
(74) *Attorney, Agent, or Firm* — Steven M. Bouknight

(57) ABSTRACT

An embodiment for coordinating edge computing in a mobile network by an MEC orchestrator. The embodiment may monitor deployment metrics and controlling deployment parameters related to a deployment of software applications on edge nodes of the mobile network The embodiment may receive an optimization report from a network orchestrator of the mobile network. The embodiment may, based on the optimization report, determine a current optimization efficiency of the mobile network. The embodiment may, if the optimization efficiency fulfils an inefficiency criterion, determine deployment suggestions having assigned one or more of the deployment parameters and being indicative of an expected response of one or more of the deployment metrics to a suggested variation of the assigned deployment parameters. The embodiment may transmit the deployment suggestions to the network orchestrator. The embodiment may, in response to receiving from the network orchestrator an indication of a selected deployment suggestion, apply the suggested variation.

13 Claims, 5 Drawing Sheets

(56) References Cited

U.S. PATENT DOCUMENTS

2021/0126840 A1  4/2021  Venkataramu
2022/0006857 A1  1/2022  Sun
2022/0342648 A1* 10/2022  Ramaswamy ........ H04L 41/145

OTHER PUBLICATIONS

United Kingdom Patent Office, International Search Report, United Kingdom Application No. GB2312782.2, Dated Feb. 8, 2024, IBM Docket No. P202205184GB01, 3 Pages.

* cited by examiner

| Time interval | User profiling | SLA fulfilment | Number of optimization messages exchanged | SLA improvement to optimization message increase ratio | Increase in the optimization messages sent | CPU load | GPU load |
|---|---|---|---|---|---|---|---|
| 13.12.2022 20:00:01-20:05:00 | 60% uLLC, 30% eMBB, 10% MTC | 60%,99%,100% | 1500 | | | 75% | 50% |
| 13.12.2022 20:05:01-20:10:00 | 62% uLLC, 29% eMBB, 9% MTC | 61%,98%,100% | 1650 | +1%,-1%,0% | 150 | 77% | 63% |
| 13.12.2022 20:10:01-20:15:00 | 62% uLLC, 30% eMBB, 8% MTC | 60%,95%,100% | 1700 | +1%,-3%,0% | 50 | 80% | 68% |
| 13.12.2022 20:15:01-20:20:00 | 63% uLLC, 29% eMBB, 8% MTC | 59%,90%,99% | 1800 | -1%,-5%,-1% | 100 | 83% | 72% |
| ... | ... | ... | ... | ... | ... | ... | ... |

Fig. 4

| Option | Action |
|---|---|
| Option 1 | m out of n apps are migrated from edge 1 to other edge or public cloud and app X is moved to the edge 1 resulting with 2 ms delay less |
| Option 2 | m out of n apps are migrated from edge 1 to other edge or public cloud and the remaining apps have access delay that is 3 ms less |
| Option 3 | app X is relocated on another edge resulting with 1 ms delay less. |
| Option 4 | Part of users migrated to app instance in the cloud and the x CPU from edge 1 is freed. Migrated users have 5 ms extra latency added. The users that stay have 2 ms delay less. |

Fig. 5

COORDINATION OF EDGE COMPUTING IN A MOBILE NETWORK

BACKGROUND

The present invention relates to edge computing in a mobile or cellular network, in particular coordination of edge computing in a mobile or cellular network using multiple interoperating devices.

Modern telecommunications networks are highly distributed towards edges. They introduce application domains on the very edge, e.g., multi-access edge computing (MEC), that provide cloud computing capabilities for enabling next-generation (e.g., 5G) use cases. MEC implementations may utilize an orchestrator that optimizes application deployment on the edge to cater the user dynamics.

The MEC domain is not integral part of the overall mobile network ecosystem, but rather leans on it by consuming insights from it and operating independently. In particular, MEC devices can listen to occurrences and insights from the cellular network, but it is not possible for the mobile network to receive or process information from the MEC domain.

Optimization loops in cellular networks aim to fulfil requirements of various use cases, while utilizing edge energy and infrastructure resources. In parallel, MEC entities may receive information from the cellular network and make decisions on, e.g., application placement to fulfil the use case requirements, while utilizing edge energy and infrastructure resources. As the possibilities to mutually account for current status information, independent optimization decisions in the MEC and the cellular domain can be suboptimal in the cross-domain context, which may lead to inefficient usage of edge resources.

U.S. Pat. No. 11,258,873 B2 discloses an architecture to allow the spatial separation of information sources, information processing, and information consumption using objects and tags, including in MEC communication environments.

U.S. Pat. No. 10,897,493 B2 discloses an MEC controller that may predict locations for a tracked UE at different future times, and may also predict content that the tracked user equipment (UE) may request at the different future times. The predictions may be based on MEC controller computing probabilities for the tracked UE being at the different locations at the different future times, and/or probabilities for the content that the tracked UE is likely to request at the different locations and/or future times.

SUMMARY

In one aspect, the invention relates to a method of coordinating edge computing in a mobile network, the method including, by a multi-access edge computing, MEC, orchestrator operating on the mobile network, monitoring deployment metrics and controlling deployment parameters, the deployment metrics and the deployment parameters being related to a deployment of software applications on edge nodes of the mobile network; receiving an optimization report from a network orchestrator of the mobile network; based on the optimization report, determining a current optimization efficiency of the mobile network; if the optimization efficiency fulfils a predefined inefficiency criterion: determining a set of deployment suggestions, each deployment suggestion having assigned one or more of the deployment parameters and being indicative of an expected response of one or more of the deployment metrics to a suggested variation of the one or more assigned deployment parameters; and transmitting the set of deployment suggestions to the network orchestrator; and in response to receiving from the network orchestrator an indication of a selected suggestion selected from the set of deployment suggestions, applying the suggested variation of the one or more deployment parameters assigned to the selected suggestion.

In another aspect, the invention relates to a computer program product for coordinating edge computing in a mobile network, the computer program product including a computer readable storage medium having program instructions embodied therewith, the program instructions being executable by a computing device installed in or connected to the mobile network to cause the computing device to perform functions of an MEC orchestrator implementing the method of coordinating edge computing in a mobile network by a multi-access edge computing, MEC, orchestrator.

In another aspect, the invention relates to a computing device configured as an MEC orchestrator implementing the method of coordinating edge computing in a mobile network by a multi-access edge computing, MEC, orchestrator.

In a further aspect, the invention relates to a method of coordinating edge computing in a mobile network, the method including, by a first network orchestrator of the mobile network: performing a first optimization task within the mobile network and monitoring optimization metrics related to the first optimization task; transmitting an optimization report to a multi-access edge computing, MEC, orchestrator operating on the mobile network, the optimization report being based on the optimization metrics; receiving from the MEC orchestrator a set of deployment suggestions, each deployment suggestion having assigned deployment parameters and being indicative of an expected response of deployment metrics to a suggested variation of the assigned deployment parameters, the deployment metrics and the deployment parameters being related to a deployment of software applications on edge nodes of the mobile network; identifying from the set of deployment suggestions a selected suggestion providing a greatest extent of support for the first optimization task; and transmitting an indication of the selected suggestion to the MEC orchestrator for applying the suggested variation of the deployment parameters assigned to the selected suggestion.

In another aspect, the invention relates to a computer program product for coordinating edge computing in a mobile network, the computer program product including a computer readable storage medium having program instructions embodied therewith, the program instructions being executable by a computing device installed in the mobile network to cause the computing device to perform functions of a network orchestrator implementing the method of coordinating edge computing in a mobile network by a first network orchestrator of the mobile network.

In another aspect, the invention relates to a computing device configured as a network orchestrator implementing the method of coordinating edge computing in a mobile network by a first network orchestrator of the mobile network.

In a further aspect, the invention relates to a system for providing edge computing in a mobile network, the system including a computing device installed in the mobile network and configured as a first network orchestrator, the system further including a computing device installed in or connected to the mobile network and configured as a multi-access edge computing, MEC, orchestrator, the system being configured for performing a method including: by the first network orchestrator: performing a first optimization task within the mobile network and monitoring optimization metrics related to the first optimization task; transmitting an optimization report to the MEC orchestrator, the optimization report being based on the optimization metrics; by the MEC orchestrator: monitoring deployment metrics and controlling deployment parameters, the deployment metrics and the deployment parameters being related to a deployment of software applications on edge nodes of the mobile network; receiving the optimization report from the first network orchestrator; based on the optimization report, determining a current optimization efficiency of the mobile network; if the optimization efficiency fulfils a predefined inefficiency criterion: determining a set of deployment suggestions, each deployment suggestion having assigned one or more of the deployment parameters and being indicative of an expected response of one or more of the deployment metrics to a suggested variation of the one or more assigned deployment parameters; transmitting the set of deployment suggestions to the first network orchestrator; by the first network orchestrator in response to receiving the set of deployment suggestions from the MEC orchestrator: identifying from the set of deployment suggestions a selected suggestion providing a greatest extent of support for the first optimization task; transmitting an indication of the selected suggestion to the MEC orchestrator; by the MEC orchestrator in response to receiving the indication of the selected suggestion from the first network orchestrator, applying the suggested variation of the one or more deployment parameters assigned to the selected suggestion.

In a further aspect, the invention relates to a method of coordinating edge computing in a mobile network, the mobile network including a first network orchestrator performing a first optimization task within a first optimization domain of the mobile network, a second network orchestrator performing a second optimization task within a second optimization domain of the mobile network, and a multi-domain orchestrator controlling the performance of the first optimization task by the first network orchestrator and the performance of the second optimization task by the second network orchestrator, the method including, by the multi-domain orchestrator: receiving a set of deployment suggestions from the first network orchestrator, each deployment suggestion having assigned deployment parameters and being indicative of an expected response of deployment metrics to a suggested variation of the assigned deployment parameters, the deployment metrics and the deployment parameters being related to a deployment of software applications on edge nodes of the mobile network; identifying from the set of deployment suggestions a selected suggestion providing a greatest extent of support for the first optimization task and the second optimization task; and transmitting an indication of the selected suggestion to the first network orchestrator.

In another aspect, the invention relates to a computer program product for coordinating edge computing in a mobile network, the computer program product including a computer readable storage medium having program instructions embodied therewith, the program instructions being executable by a computing device installed in the mobile network to cause the computing device to perform functions of a multi-domain orchestrator implementing the method of coordinating edge computing in a mobile network by a multi-domain orchestrator.

In another aspect, the invention relates to a computing device configured as a network orchestrator implementing the method of coordinating edge computing in a mobile network by a multi-domain orchestrator.

Embodiments of the invention may have the advantage of enabling cooperative coordination between the mobile network and the MEC domain, such that the MEC orchestrator may adapt details of application deployment in a way to support more effective, and thus more resource efficient, optimization within the mobile network.

Embodiments of the invention are given in the dependent claims. Embodiments of the present invention can be freely combined with each other if they are not mutually exclusive.

BRIEF DESCRIPTION OF THE DRAWINGS

In the following, embodiments of the invention are explained in greater detail, by way of example only, making reference to the drawings in which:

FIG. 4 is a table showing possible contents of optimization reports;

FIG. 5 is a table showing possible deployment suggestions; and

DETAILED DESCRIPTION

Figure 1:
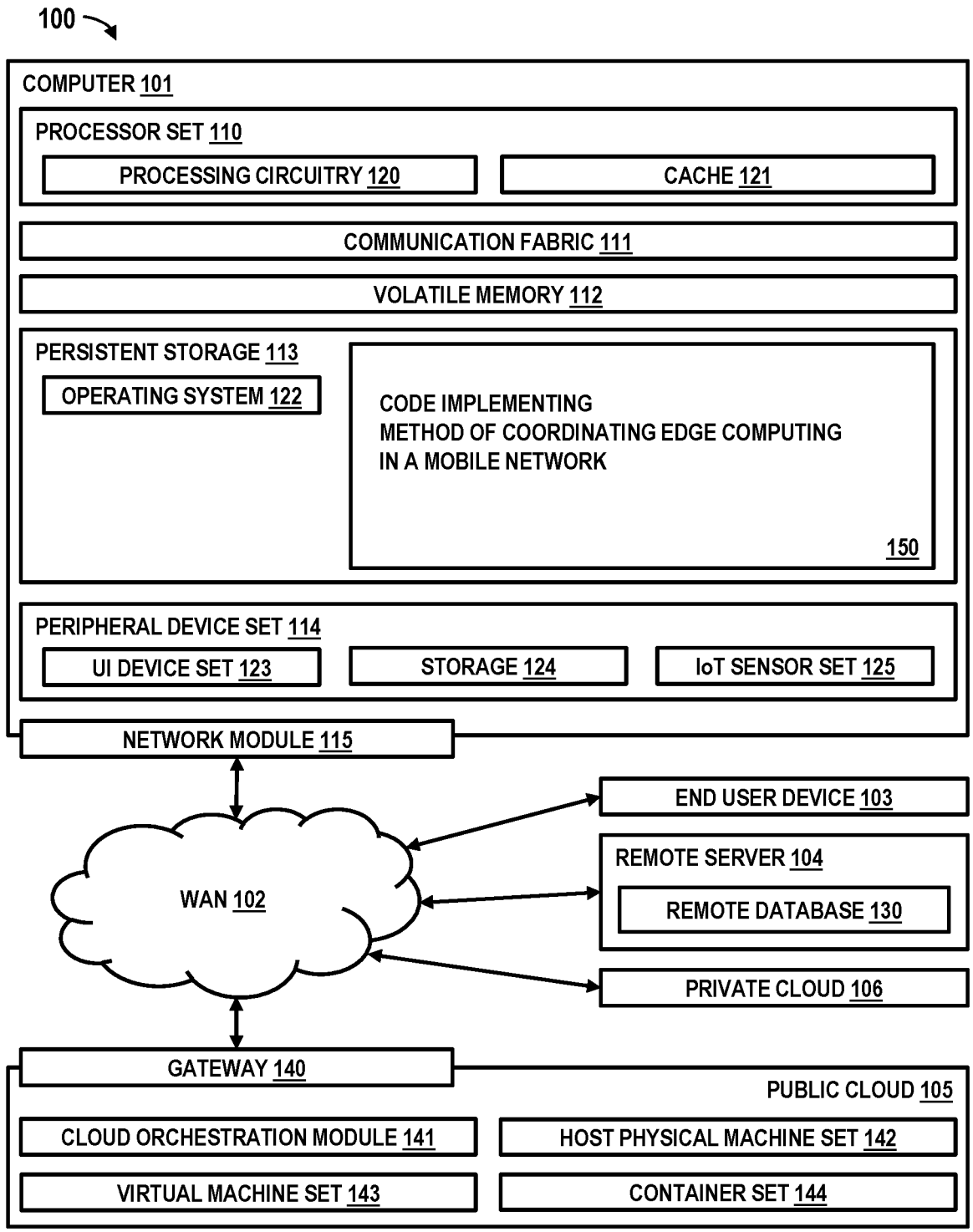
FIG. 1 schematically depicts components of a computing device within a computing environment.

The technique of multi-access edge computing, MEC, was developed after the widespread establishment of mobile networks. The mobile network may perform independent routines of optimizing consumption of computing and/or communications resources based on its internal information. MEC control routines may be programmed to change application deployment parameters according to information coincidentally received from communications of the mobile network. Accordingly, finding application deployment parameters that improve the network's optimization goals may also be subject to coincidence. Hence, there is a potential for an MEC-side management of application deployment with a more effective support for the mobile network's optimization routines.

Within the present disclosure, it shall be understood that, wherever technically meaningful and free of contradictions, features phrased in plural forms such as "deployment metrics", "deployment parameters", "optimization metrics", "edge nodes", "software applications", "deployment suggestions", etc. also include the singular forms of these features, e.g., a single deployment metric, a single deployment parameter, a single optimization metric, a single edge node, a single software application, a single deployment suggestion, etc. Likewise, features phrased in singular form such as "optimization task", "optimization report", "optimization efficiency", "inefficiency criterion", "suggested variation", "selected suggestion", etc. shall also include the plural forms of these features, e.g., multiple optimization tasks, multiple optimization reports, multiple optimization efficiencies, multiple inefficiency criteria, multiple suggested variations, multiple selected suggestions, etc.

A mobile network, or cellular network, may comprise various computing devices, some of which may be configured (e.g., programmed and/or designed) for performing optimization tasks. For simplicity of presentation it will be assumed, without limitation, that optimization tasks are directed to improve measures of efficiency of consumption of technical resources that are related to the functioning of the mobile network or portions thereof. Non-limiting examples of such technical resources include time-related resources such as calculation durations and delay times; device availabilities such as a number of available processors, processor cores, processing nodes; usage figures such as processor loads, bandwidths, memory usages; etc.

Optimization tasks may be implemented as algorithms whose execution may be controlled by a network orchestrator. Within the present disclosure, an orchestrator shall be understood as any physical device or logical entity that is configured (e.g., programmed and/or designed) for performing optimization tasks. Functions of an orchestrator may be specific to a certain domain of optimization. For instance, an MEC orchestrator may be configured for controlling deployment parameters, i.e., parameters of software application deployment on edge nodes of the mobile network, while a network orchestrator may be configured for controlling internal optimization parameters of the mobile network.

Orchestrators may have a generic function, i.e., configured for controlling any available parameter, or a domain-specific function, i.e., configured for controlling a limited group of parameters characteristic of the domain. Likewise, orchestrators may perform their functions globally, i.e., configured for controlling parameters affecting the entire mobile network, or locally, i.e., configured for controlling parameters affecting a limited section of the mobile network. An MEC orchestrator may be implemented by, or run on, a computing device that is part of the mobile network, or a computing device that is external to the mobile network and connected thereto by a link. An orchestrator may be a multi-domain orchestrator that is configured for controlling operating parameters of multiple domain-specific orchestrators. Different orchestrators may be implemented on or by different of equal computing devices.

Furthermore, orchestrators may be configured for monitoring metrics that may be indicative of an effectiveness of the respective optimization tasks carried out by the orchestrators. For instance, an MC orchestrator may be configured for monitoring deployment metrics descriptive of the software application deployment, and a network orchestrator may be configured for monitoring optimization metrics descriptive of an internal status of the mobile network that may be influenced by the optimization parameters.

The MEC orchestrator receives an optimization report from a network orchestrator and sends back a set of deployment suggestions if the optimization report indicates circumstances of inefficiency. The optimization report may be a dataset that is dedicated for being analysed by the MEC orchestrator for signs of inefficiency. This may give the MEC orchestrator a more complete picture of an internal status of the mobile network than a likely chronologically incoherent and incomplete patchwork of information the MEC orchestrator would obtain by solely listening to traffic of the mobile network. By sending back the set of deployment suggestions to the network orchestrator, the network orchestrator may get enabled to influence deployment parameters of edge computing in its favour. This may increase the probability that a variation of deployment parameters is applied that actually increases the efficiency (e.g., by lowering consumption of computing and/or network resources). Furthermore, the computational effort of determining a variation of deployment parameters that is likely to increase efficiency of optimization tasks in the mobile network is split between the MEC orchestrator and the network orchestrator, which may reduce the processing load of the MEC orchestrator, but may also reduce the amount of data to be transferred between the network orchestrator and the MEC orchestrator, as the MEC orchestrator may require more information than that included in the optimization report if it were to determine an optimal variation of deployment parameters alone.

Advantages of the present invention may become even clearer when considering the mutual interactions of the involved orchestrators. The MEC orchestrator receives from the network orchestrator an optimization report that is based on optimization metrics related to optimization tasks performed by the network orchestrator. If the optimization report indicates that the optimization tasks are running with a low efficiency, the MEC orchestrator transmits to the network orchestrator a set of deployment suggestions that indicate possible suggested variations of deployment parameters that are related to a deployment of software applications on edge nodes and an expected response to these variations by the deployment metrics. The network orchestrator selects one of the deployment suggestions and informs the MEC orchestrator about the selection result. The MEC orchestrator then applies the variation of deployment parameters that was suggested for the selected deployment suggestion.

This approach may yield several improvements beyond the possibilities of an MEC-enabled mobile network as known so far. The optimization report may contain information that is not accessible for the MEC orchestrator by listening to traffic from the mobile network alone. This may allow the MEC orchestrator to obtain deployment suggestions that are also based on the optimization report, and may thus be more likely to support the optimization tasks performed by the network orchestrator. In turn, the set of deployment suggestions may allow the network orchestrator to exert an influence on the deployment of software applications on edge nodes that would otherwise be independently controlled by the MEC orchestrator. In addition, applying the suggested variation of the selected suggestion, that was identified by the network orchestrator to be most promising for supporting the optimization tasks, may increase the chance of a more successful performance of the optimization tasks, increasing the probability that resources of the mobile network are consumed more efficiently, and may avoid a trial-and-error behaviour of the MEC orchestrator to find out indirectly which possible variation of deployment parameters improves the optimization efficiency.

In addition to the examples and alternatives indicated herein, it has to be noted that the optimization report may be repeatedly generated and may be transmitted, e.g., after elapsing of a predefined time interval, and may comprise averaged or otherwise aggregated values (e.g., minimum, maximum, median, . . . ) of one or more of the optimization metrics over such predefined time interval. The network orchestrator may select and indicate to the MEC orchestrator multiple selected suggestions as may yield a greatest support to the optimization tasks.

The optimization efficiency may be considered as a numeric value, or a category indicating a trend of such numeric value, that is based on the optimization metrics and indicates an effectiveness or successful performance of the optimization tasks. The inefficiency criterion may be a means of logical comparison, such as an inequality having a predefined threshold value defining ranges for a numeric optimization efficiency where the inefficiency criterion is fulfilled and, respectively, where it is not fulfilled, or an equality having a predefined matching category where the inefficiency criterion is fulfilled and where it is not fulfilled if the optimization efficiency is not matching the predefined matching category. The set of deployment suggestions may contain at least one deployment suggestion and each deployment suggestion may specify a suggested variation for at least one deployment parameter and may indicate an expected response for at least one deployment metric. It is assumed that the MEC orchestrator has sufficient amount and types of data available to determine or estimate the expected response to the suggested variation.

A greatest extent of support for an optimization task may be determined by analysing how optimization metrics may respond to the suggested variation and/or its corresponding expected response of one or more deployment metrics, and determining by comparison if there is one or more deployment suggestion that improves efficiency of resource consumption more than other deployment suggestions. This determination may yield multiple supportive deployment suggestions, or may be unsuccessful if the set of deployment suggestions contains no deployment suggestion that stands out in supporting the optimization tasks; no deployment suggestion that fulfils a threshold criterion defining a least required response of the deployment metrics; too many deployment suggestions such that none of them could be selected in favour of the others; multiple deployment suggestions mutually cancelling their supportive effects; or if the determination itself would require a too complex or time-demanding calculation by the network orchestrator. If there is no escape routine for the case of an unsuccessful identification of the selected suggestion, the method may still quit successfully in all cases where this identification succeeds.

According to an example, the deployment metrics are selected from at least one of a latency experienced by one or more of the software applications, a number of the edge nodes available as hosts for the deployment of the software applications, a latency experienced by a user connected to the edge nodes, a network latency of one or more of the edge nodes, a processing load of one or more of the edge nodes, a network load of one or more of the edge nodes or of a communication link of the mobile network, a number of users connected to one or more of the edge nodes, a mobility of user connections between the edge nodes, a list of services available on one or more of the edge nodes, and a topology of the edge nodes within the mobile network.

This may, respectively, support the optimization task by reducing the latency experienced by one or more of the software applications; increasing the number of the edge nodes available as hosts for the deployment of the software applications; decreasing the latency experienced by a user connected to the edge nodes; decreasing the network latency of one or more of the edge nodes; decreasing the processing load of one or more of the edge nodes, decreasing the network load of one or more of the edge nodes or of a communication link of the mobile network; decreasing or equalising the number of users connected to one or more of the edge nodes; provisioning sufficient resources to accommodate the mobility of user connections between the edge nodes; improved provisioning of required services for the application deployment on one or more of the edge nodes; or improving adaptation of the application deployment to the topology of the edge nodes within the mobile network.

According to an example, the suggested variation of the one or more assigned deployment parameters is selected from at least one of an initialization of execution of one or more of the software applications by one of the edge nodes, a termination of execution of one or more of the software applications by one of the edge nodes, a migration of execution of one or more of the software applications to one or more of the edge nodes or a cloud computing resource, an adjustment of a rule or of a requirement for the deployment of one or more of the software applications, and a migration of a user connection pertaining to an instance of a given one of the software applications being executed by one of the edge nodes to an instance of the given software application being executed by another one of the edge nodes or by a cloud computing resource.

Selecting the suggested variation from said group may increase flexibility of defining possible measures to support fulfilment of the optimization tasks, which may increase the probability that the network orchestrator successfully identifies a selected suggestion that provides a greatest extent of support for the optimization tasks. In particular, an initialization of execution of one or more of the software applications by one of the edge nodes may provide additional computing resources for the one or more software applications. A termination of execution of one or more of the software applications by one of the edge nodes may free used computing resources. A migration of execution of one or more of the software applications to one or more of the edge nodes or a cloud computing resource may enable influencing delay times, e.g., decreasing delay times for strongly demanded applications or applications having comparably high resource requirements, or increasing delay times for weakly demanded applications or applications having comparably low resource requirements. An adjustment of a rule or of a requirement for the deployment of one or more of the software applications may enable unblocking execution for some of the one or more applications, or may enable blocking execution for some of the one or more applications having, e.g., a comparably high consumption of computing resources. A migration of a user connection pertaining to an instance of a given one of the software applications being executed by one of the edge nodes to an instance of the given software application being executed by another one of the edge nodes or by a cloud computing resource may increase availability of the edge node from which the user connection is removed. Within the context of the present disclosure, a "user connection pertaining to an instance of a software application executed by an edge node" shall be understood as a connection enabling exchange of information between a device external to the mobile network and the edge node, wherein the connection is used to exchange information between the external device and the instance of the software application.

Within the present disclosure, two numerical quantities shall be defined to be correlated if there is a correlation coefficient that has a value of at least 50 percent for the two numerical quantities. Furthermore, a stagnation of a quantity is defined by multiple subsequent sampling values of the quantity lying within a stagnation range that is not broader than a predefined portion that is small (e.g., 1%, 3%, 5%, 10%) compared to a largest possible, or reasonably expectable, range of variation of this quantity. Moreover, a usage profile shall be understood as a category that is assigned to a portion of processor load or network load (e.g., a thread to be processed by a processor, or data to be processed by a processor or to be transferred via a link of the mobile network) and reflects technical requirements or properties that are characteristic of the processor load or network load. Without limitation, a 5G mobile network may typically have defined usage profiles "Enhanced Mobile Broadband" (eMBB), "Ultra-Reliable Low-Latency Communication"

(uRLLC), and "Massive Machine-Type Communication" (mMTC). Additionally, an "optimization impact" is defined herein as any quantity that is suitable for determining whether the performance of the optimization task is successful, and that is derived or different from the optimization metrics.

According to an example, the optimization report is based on optimization metrics, the optimization efficiency being correlated to one or more of the optimization metrics selected from at least one of: a degree of fulfilment of a service level agreement, SLA fulfilment, realized by the mobile network, wherein fulfilment of the inefficiency criterion is correlated to a decrease, or a stagnation below a predefined minimum, of the SLA fulfilment; a processor load experienced by a processor working in the mobile network, wherein fulfilment of the inefficiency criterion is correlated to an increase, or a stagnation above a predefined maximum, of the processor load; a network load experienced by a communication link of the mobile network, wherein fulfilment of the inefficiency criterion is correlated to an increase, or a stagnation above a predefined maximum, of the network load; a share of a predefined usage profile, profile share, in the processor load or the network load, wherein fulfilment of the inefficiency criterion is correlated to an increase, or a stagnation above a predefined maximum, of the profile share of a usage profile having a comparably high requirement of processing resources or network resources; a number of optimization cycles of repeated execution of an optimization task performed by the network orchestrator, the optimization metrics being related to the optimization task, wherein fulfilment of the inefficiency criterion is correlated to an increase, or a stagnation above a predefined maximum, of the number of optimization cycles; a number of optimization messages issued in the mobile network, wherein fulfilment of the inefficiency criterion is correlated to an increase, or a stagnation above a predefined maximum, of the number of optimization messages; and an optimization impact quantifying a successful performance of the optimization task, wherein fulfilment of the inefficiency criterion is correlated to a decrease, or a stagnation below a predefined minimum, of the optimization impact.

This may offer several different ways of defining the optimization efficiency, and may allow for taking into account a multitude of optimization metrics when determining the efficiency of the optimization tasks. In this way, the probability of successfully detecting an inefficiency inside the mobile network related to the optimization tasks may be increased. In particular, detecting a decrease or low-level stagnation of an SLA fulfilment may give a hint on an inefficiency on a general level of the mobile network. Detecting an increase or high-level stagnation of a processor load may enable identifying a shortage of computing resources. Detecting an increase or high-level stagnation of a network load may enable identifying a shortage of network resources. Detecting an increase or high-level stagnation of a profile share pertaining to a particular usage profile may enable identifying a shortage of resources specific to that particular usage profile. Detecting an increase or high-level stagnation of a number of optimization cycles may enable identifying an issue that prevents successful completion of the optimization tasks. Detecting an increase or high-level stagnation of a number of issued optimization messages may enable identifying a shortage of resources needed for a successful completion of the optimization tasks. Detecting a decrease or low-level stagnation of an optimization impact may enable applying a formula based on the optimization metrics, or taking into account additional or complementary quantities beyond the optimization metrics, in order to identify more complex inefficiencies of the mobile network. Load quantities such as network load and processor load may be aggregated from multiple network links/user connections and processors/processing devices, respectively.

According to an example, the set of deployment suggestions is determined from a set of deployment items, the deployment metrics and the deployment parameters being related to the deployment items, the determination of the set of deployment suggestions including: determining, for the deployment items, an expected response of one or more of the deployment metrics to a possible variation of one or more of the deployment parameters; ranking the set of deployment items by the expected response; and including the ranked deployment items as the deployment suggestions in the set of deployment suggestions according to a predefined cutoff criterion for the expected response, wherein the suggested variation of the one or more assigned deployment parameters is the possible variation of the one or more deployment parameters related to the corresponding deployment item.

Using a ranking in combination with a cutoff criterion may prevent the network controller from getting cluttered with irrelevant deployment suggestions that do not appear to yield a significant support for the optimization tasks. The present disclosure defines deployment items as any technical resources or givens to which a variation of a deployment parameter can be applied. According to an example, the deployment items are selected from at least one of the software applications, different instances of one or more of the software applications, and user connections to one or more of the edge nodes. Once an expected response is determined for a possible variation of deployment parameters pertaining to a given deployment item, a dataset defining an assignment between the given deployment item, the possible variation of deployment parameters affecting the given deployment item, and the expected response of deployment metrics to said possible variation can be established as a deployment suggestion if its expected response is accepted under the predefined cutoff criterion.

The cutoff criterion may comprise, e.g., a logical statement and/or a formula that includes such assigning dataset into the set of deployment suggestions if the expected response recorded in the assigning dataset is significant enough. For an expected response of a particular deployment metric, the cutoff criterion may establish, for instance, that the change of this deployment metric in response to the possible variation shall be at least a predefined threshold value. A direction or sign of such change may be excluded, e.g., if a negative response is considered detrimental to any optimization in the mobile network. Aggregated criteria for expected responses containing multiple deployment metrics may be defined as a combination (e.g., using logical operators such as "and", "or", "not", "xor", etc., and/or using an arithmetic formula) of predefined atomic criteria for each of the deployment metrics included in the expected response.

According to an example, the first network orchestrator is selected from at least one of a near-real-time radio access network intelligent controller, near-RT RIC; a non-real-time radio access network intelligent controller, non-RT RIC; a transport layer orchestrator; and a cloud computing orchestrator. A near-RT RIC may be a good choice for the first network orchestrator to implement a responsive coordination of edge computing in the mobile network that may react quickly to changes in the usage behaviour of the mobile network in general, and of the edge nodes in particular (e.g., accommodating a large number of user connections at the beginning of a public event). A non-RT RIC may also be eligible for coordinating edge computing in the mobile network with regard to interactions between edge-node application deployment and general, not time-critical optimization tasks. A transport layer orchestrator may perform optimization tasks specific to the transport layer that are inaccessible to the RICs, but may also have interactions with edge-node application deployment. A cloud computing orchestrator may perform optimization tasks related to provisioning of cloud resources (e.g., processing and/or memory resources) to the mobile network that may also support edge-node application deployment. By selecting the first network orchestrator from said group, optimization inefficiencies may be identified and mitigated in a broader range of optimization domains, improving applicability and effectiveness of the method. According to an example, the first network orchestrator performs the first optimization task within a first optimization domain of the mobile network, the mobile network further including a second network orchestrator performing a second optimization task within a second optimization domain of the mobile network, the mobile network further including a multi-domain orchestrator controlling the performance of the first optimization task by the first network orchestrator and the performance of the second optimization task by the second network orchestrator, the identification of the selected suggestion including, in case the first network orchestrator is unable to determine the greatest extent of support for the first optimization task, forwarding the set of deployment suggestions to the multi-domain orchestrator and receiving the indication of the selected suggestion from the multi-domain orchestrator.

This may increase the probability that at least one of the deployment suggestions is selected in case the network orchestrator is unable to perform the selection alone. For instance, this may be the case if the set of deployment suggestions contains no deployment suggestion that stands out in supporting the optimization tasks; no deployment suggestion that fulfils a threshold criterion defining a least required response of the deployment metrics; too many deployment suggestions such that none of them could be selected in favour of the others; multiple deployment suggestions mutually cancelling their supportive effects for the optimization task; or if the determination itself would require a too complex or time-demanding calculation by the network orchestrator. The multi-domain orchestrator may have available additional information that, when taken into account, may facilitate identifying the selected suggestion, or may control further orchestrators, such as the second network orchestrator, performing other optimization tasks that may benefit more clearly from the deployment suggestions, or may have more free resources for identifying the selected suggestion than the first network orchestrator. Notwithstanding any disclosed interactions between the first network orchestrator and the multi-domain orchestrator as well as any disclosed functions of the first network orchestrator and the multi-domain orchestrator, the second network orchestrator may likewise, as the first network orchestrator, be configured for performing the method of coordinating edge computing in a mobile network by a first network orchestrator.

According to an example, the optimization metrics are selected from at least one of: a degree of fulfilment of a service level agreement realized by the mobile network; a processor load experienced by a processor working in the mobile network; a network load experienced by a communication link of the mobile network; a share of a predefined usage profile in the processor load or the network load; a number of optimization cycles of repeated execution of the optimization task; a number of optimization messages issued in the mobile network; and an optimization impact quantifying a successful performance of the optimization task.

As the optimization efficiency is based on the optimization metrics comprised by the optimization report, this may offer several different ways of defining the optimization efficiency, and may allow for taking into account a multitude of optimization metrics when determining the efficiency of the optimization tasks. In this way, the probability of successfully detecting an inefficiency inside the mobile network related to the optimization tasks may be increased.

According to an example, the identification of the selected suggestion comprises determining an expected response of the optimization metrics to the expected response of the deployment metrics indicated by the deployment suggestions, and selecting the selected suggestion from the deployment suggestions according to a fulfilment of a predefined selection criterion by the expected response of the optimization metrics. This may be a convenient way of quantitatively determining the effect that a suggested variation of the deployment parameters may have on the optimization metrics as the optimization metrics are readily available for the first network orchestrator and may be correlated in a known manner to the deployment metrics responding to the suggested variation. In this way, the network orchestrator may identify the selected suggestion with an efficient consumption of its computing resources, without having to analyse such correlations and dependencies, or having to find a meaningful quantity enabling an assessment of support for a given optimization task, each time it receives a set of deployment suggestions from the MEC orchestrator.

According to an example, the first network orchestrator performs the first optimization task within a first optimization domain of the mobile network, the system further including a computing device installed in the mobile network and configured as a second network orchestrator performing a second optimization task within a second optimization domain of the mobile network, the system further including a computing device installed in the mobile network and configured as a multi-domain orchestrator controlling the performance of the first optimization task by the first network orchestrator and the performance of the second optimization task by the second network orchestrator, the identification of the selected suggestion including, in case the first network orchestrator is unable to determine the greatest extent of support for the first optimization task, forwarding the set of deployment suggestions to the multi-domain orchestrator and receiving the indication of the selected suggestion from the multi-domain orchestrator, the method further including, by the multi-domain orchestrator upon receiving the set of deployment suggestions from the first network orchestrator, identifying from the set of deployment suggestions the selected suggestion providing a greatest extent of support for the first optimization task and the second optimization task, and transmitting the indication of the selected suggestion to the first network orchestrator.

This may increase the probability that at least one of the deployment suggestions is selected in case the network orchestrator is unable to perform the selection alone. For instance, this may be the case if the set of deployment suggestions contains no deployment suggestion that stands out in supporting the optimization tasks; no deployment suggestion that fulfils a threshold criterion defining a least required response of the deployment metrics; too many deployment suggestions such that none of them could be selected in favour of the others; multiple deployment suggestions mutually cancelling their supportive effects for the optimization task; or if the determination itself would require a too complex or time-demanding calculation by the network orchestrator. By controlling the second network orchestrator as well, the multi-domain orchestrator may identify an optimization task performed by the second network orchestrator that would benefit more clearly from one or more of the deployment suggestions, and may thus be more likely to successfully identify the selected suggestion from the set of deployment suggestions than the first network orchestrator could do alone. Moreover, it may be beneficial to forward the set of deployment suggestions to the multi-domain orchestrator rather than directly to the second network orchestrator as the multi-domain orchestrator may have more free resources for identifying the selected suggestion than the second network orchestrator. Notwithstanding any disclosed interactions between the first network orchestrator and the multi-domain orchestrator as well as any disclosed functions of the first network orchestrator and the multi-domain orchestrator, the second network orchestrator may likewise, as the first network orchestrator, be configured for performing the method of coordinating edge computing in a mobile network by a first network orchestrator.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fibre optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Now turning to the drawings, FIG. 1 schematically depicts components of a computing device 101 within a computing environment 100. Computing environment 100 contains an example of an environment for the execution of at least some of the computer code involved in performing the inventive methods, such as code 150 implementing one of the methods of coordinating edge computing in a mobile network. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fibre optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibres, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
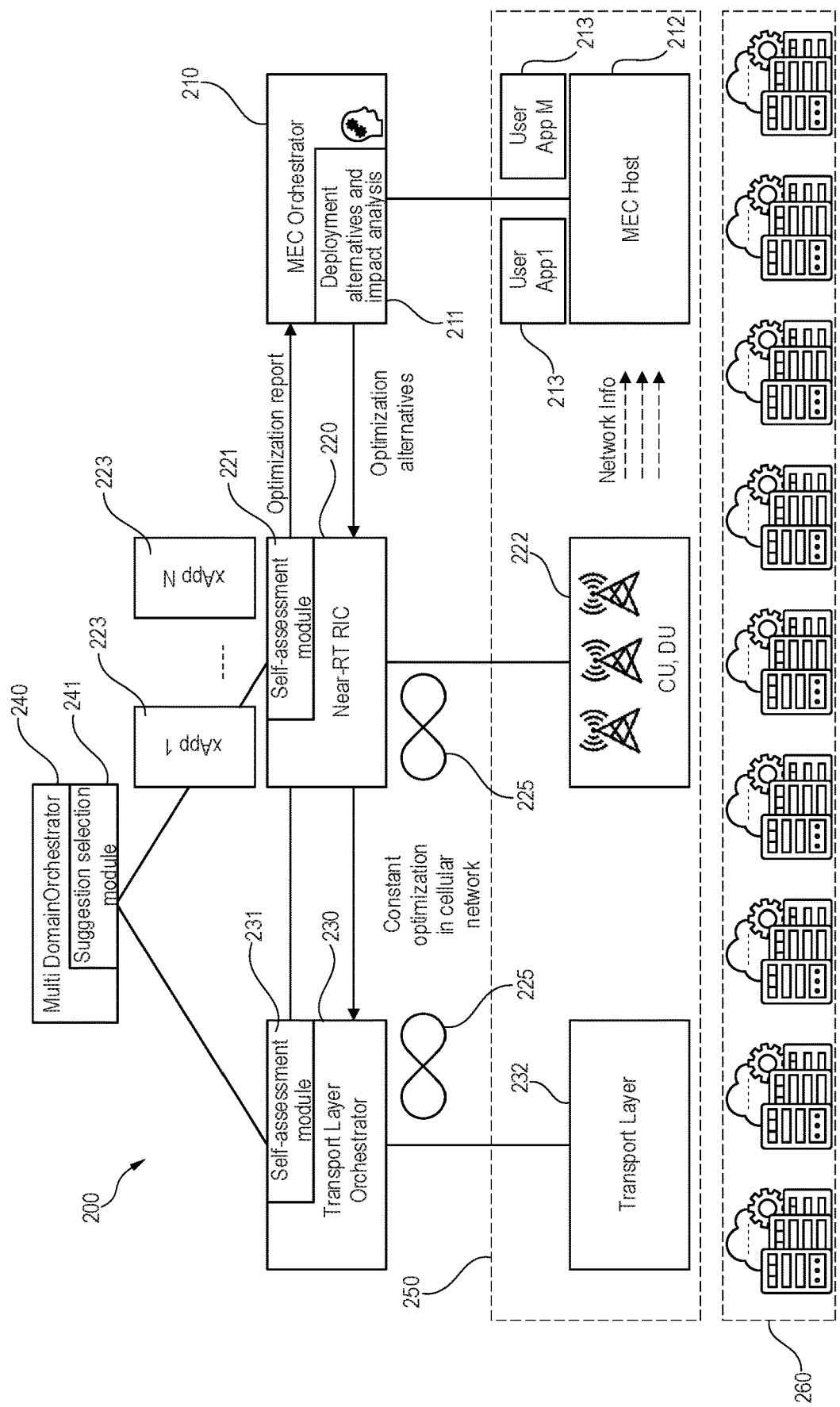
FIG. 2 depicts a schematic environment of devices related to a mobile network enabled for multi-access edge computing (MEC)

FIG. 2 shows an exemplary environment 200 of orchestrators configured for coordinating edge computing in or connected to a mobile network. In the example of FIG. 2, but not necessarily so, the devices of environment 200 are implemented on a common infrastructure layer 260 of the mobile network. The mobile network comprises a first network orchestrator 220 which, in the example of FIG. 2, is implemented as a near-real-time radio access network intelligent controller (near-RT RIC). Environment 200 also comprises an MEC orchestrator 210, which may be alternatively implemented outside the common infrastructure layer 260.

The first network orchestrator 220 may perform optimization tasks 225 within a first optimization domain 222 of the mobile network, which, in the example of a near-RT RIC, may comprise nodes or base stations (e.g., BTS, NodeB, eNB, gNB). An optimization task 225 may be implemented as a software process 223 executed by the network orchestrator 220, which, in the example of a near-RT RIC, may be an xApp. An optimization task 225 may include controlling, by the network orchestrator 220, optimization parameters specific to the optimization domain 222, and monitoring optimization metrics indicative of a successful performance of the optimization task 225.

The MEC orchestrator 210 may be configured for controlling deployment of software applications 213 on physical or logical (e.g., virtualized) host devices 212 by controlling deployment parameters specific to the applications 213 and/or the host 212 and monitoring deployment metrics related to the execution of the applications 213. The host devices 212 may be, or may be run on, edge nodes of the mobile network or additional computing resources such as cloud computing resources. The MEC orchestrator 210 may obtain information from the mobile network by listening on traffic communicated by the mobile network.

The first network orchestrator 220 may execute a software module 221 implementing the method of coordinating edge computing in a mobile network by a network orchestrator of the mobile network. Software module 221 causes the first network orchestrator 220 to generate an optimization report that is based on the optimization metrics and send the optimization report to the MEC orchestrator 210.

The MEC orchestrator 210 may execute a software module 211 implementing the method of coordinating edge computing in a mobile network by an MEC orchestrator. Software module 211 may cause the MEC orchestrator 220 to receive the optimization report from the first network orchestrator 221 and determine a current optimization efficiency of the mobile network using the information included in the optimization report. The software module 211 comprises a predefined inefficiency criterion to determine whether the information contained in the optimization report shows signs that the optimization efforts of the first network orchestrator 220 are being or becoming inefficient.

If an optimization inefficiency is detected, software module 211 may cause the MEC orchestrator 210 to determine a set of deployment suggestions and send it to the first network orchestrator 220. The set of deployment suggestions may be determined using data that is available to the MEC orchestrator 210, including information obtained by listening to traffic transmitted to or from the mobile network, the optimization report, and information internal to the MEC orchestrator 210. The deployment suggestions may comprise information regarding suggested possible variations of deployment parameters and respective expected responses to these variations be the deployment metrics.

Software module 221 may further cause the first network orchestrator 220 to receive the set of deployment suggestions from the MEC orchestrator 210 and to analyse their possible impact on the optimization tasks 225. Based thereon, the first network orchestrator 220 may select one or more of the deployment suggestions that may provide a greatest extent of support for an effective and/or efficient completion of the optimization tasks 225. The software module 221 may then cause the first network orchestrator 221 to communicate to the MEC orchestrator 210 which of the deployment suggestions have been selected.

The software module 211 may configure the first network orchestrator 210 to perform an escape routine in case it is difficult or impossible for the first network orchestrator to identify the selected suggestion from the set of deployment suggestions. Such escape routine may comprise transmitting the set of deployment suggestions to a multi-domain orchestrator 240 and receiving an indication of one or more selected suggestions from the multi-domain orchestrator 240 that may be forwarded to the MEC orchestrator 210 by the first network orchestrator 220.

Software module 211 may cause the MEC orchestrator 210 to receive the indication of selected deployment suggestions from the first network orchestrator 220 and apply the suggested variations of those deployment parameters that are associated with the selected deployment suggestions.

The environment 200 may comprise additional orchestrators such as a second network orchestrator 230 and/or a multi-domain orchestrator 240. The second network orchestrator may perform optimization tasks 235 within the mobile network by controlling optimization parameters of the mobile network and monitoring optimization metrics related thereto. Not necessarily may the second network orchestrator 230 be configured for performing the optimization tasks 235 using optimization parameters pertaining to a second optimization domain 232. In the example of FIG. 2, the second network orchestrator 230 is a transport layer orchestrator configured for performing optimization tasks 235 within a transport layer implemented by the mobile network.

Optionally, the second network orchestrator 230 may execute a software module 231 that implements the method of coordinating edge computing in a mobile network by a network orchestrator of the mobile network. Software module 231 may be identical to software module 221 or may comprise adaptations to specific features or functions of the second network orchestrator 230.

A multi-domain orchestrator 240 may be configured for programming multiple network orchestrators such as the first network orchestrator 220 and the second network orchestrator 230. Multi-domain orchestrator 240 may be configured for tuning functions of the first network orchestrator 220 and the second network orchestrator 235, including the performance of optimization tasks 225, 235, so as to coordinate their respective functions in a best possible complementary or collaborative manner. The multi-domain orchestrator 240 may have available information specific to such coordinating optimization tasks and to the respective network orchestrators 220, 230, including possible network orchestrators that are not configured for performing the method of coordinating edge computing in a mobile network by a network orchestrator. Moreover, the multi-domain network orchestrator 240 may have available more computing resources than the network orchestrators 220, 230 in case the coordinating optimization tasks performed by the multi-domain orchestrator 240 are less resource consuming than the optimization tasks 225, 235.

The multi-domain orchestrator 240 may execute a software module 241 implementing the method of coordinating edge computing in a mobile network by a multi-domain orchestrator. The software module 241 may cause the multi-domain orchestrator 240 to receive from a network orchestrator such as the first network orchestrator 220 or the second network orchestrator 230 the set of deployment suggestions.

The software module 241 may further cause the multi-domain orchestrator 240 to perform an analysis of impacts of the deployment suggestions similar to the analysis of the deployment suggestions performed by the first network orchestrator 220, but with a focus on obtaining a greatest extent of support for multiple optimization tasks such as the optimization tasks 225 and 235. This may include taking into account, and analysing the obtainable support for, optimization tasks performed by network orchestrators that are not configured to perform the method of coordinating edge computing in a mobile network by a network orchestrator. If one or more deployment suggestions can be selected, the multi-domain orchestrator 240 notifies the network orchestrator from which the set of deployment suggestions was received (e.g., the first network orchestrator 220) about the selected suggestions. The network orchestrator receiving the indication of the selected suggestions may then forward the indication to the MEC orchestrator 210.

Figure 3:
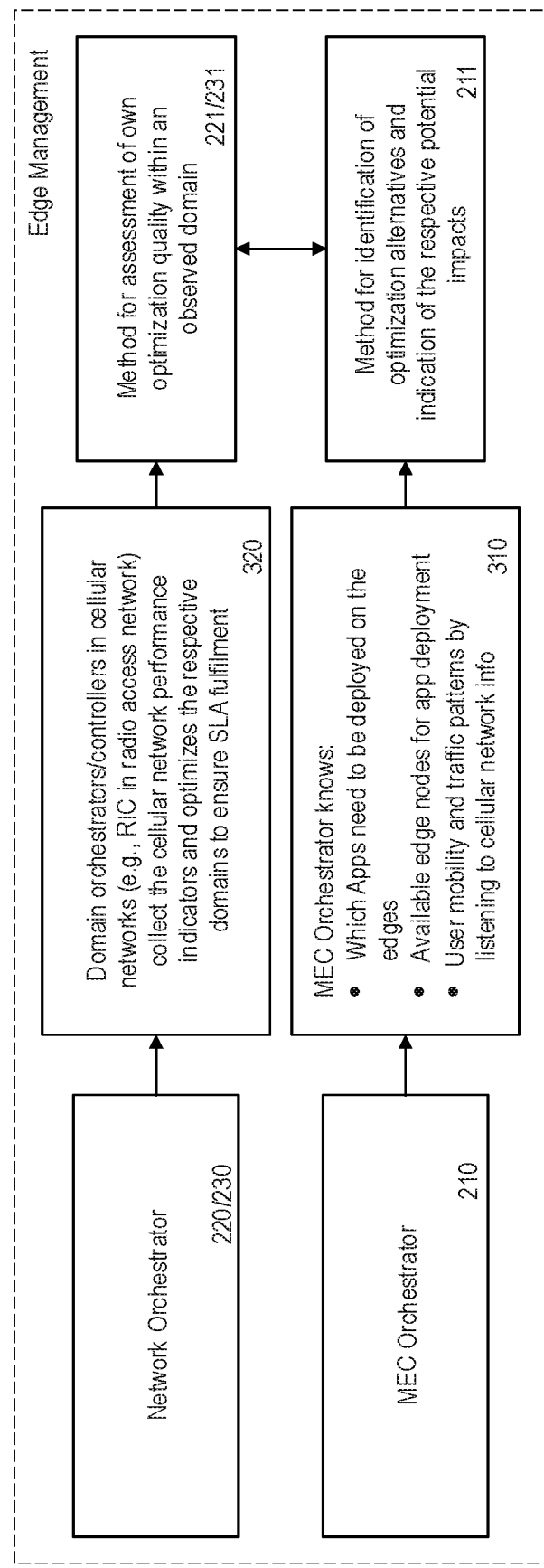
FIG. 3 is a diagram demonstrating types of information available for devices related to an MEC-enabled mobile network.

FIG. 3 depicts a diagram showing examples of information 310, 320 that may be available to an MEC orchestrator 210 and a network orchestrator 220, 230 and may be used for performing the method of coordinating edge computing in a mobile network. For instance, an MEC orchestrator 210 may have available internal information 310 indicating software applications 213 for which an execution in edge nodes is required or recommendable in consideration of current usage conditions of the mobile network. In order to decide on which edge nodes an application should be deployed, an MEC orchestrator may use information regarding availability of edge nodes for deployment as well. Furthermore, an MEC orchestrator 210 may have obtained information 310 about user mobility (e.g., current changes of user connections between edge nodes of the mobile network) and traffic patterns (e.g., directed data transfer volumes/network loads, available and used bandwidths, etc.) from listening to traffic (e.g., package metadata) received or transferred by or within the mobile network. Portions of the information available to the MEC orchestrator 210, including information not shown in FIG. 3, may be used by software module 211 as a primary and/or auxiliary input, e.g., for determining the current optimization efficiency or determining the set of deployment suggestions.

A network orchestrator 220, 230 (e.g., a domain-specific network orchestrator or a generic network orchestrator) may have available current, and optionally historical, information 320 that may enable an effective performance of its respective optimization tasks. This information 320 may include values of optimization metrics (e.g., performance indicators of the mobile network or portions thereof) as well as set values of optimization parameters influencing the optimization metrics. A non-exclusive example of an optimization metric may be a degree of fulfilment of a service level agreement, or SLA fulfilment in short. A network orchestrator 220, 230 may perform an optimization task 225 such as trying to maximize the SLA fulfilment and exceed a predefined minimum SLA fulfilment. Portions of the information 320 available to the network orchestrator 220, 230, including information not shown in FIG. 3, may be used by software module 221, 231, respectively, as a primary and/or auxiliary input, e.g., for performing the first/second optimization task 225, 235, generating the optimization report, or identifying a selected suggestion from the set of deployment suggestions.

FIG. 4 shows a table containing exemplary data that may be included in a sequence of optimization reports 400a to 400d and data that may be derived from these data. In the example of FIG. 4, the optimization reports are generated and transmitted on a regular basis, each optimization report 400 spanning a time period of 5 minutes. Each optimization report 400 comprises a specification of the time interval represented by the data of the optimization report; aggregated (e.g., averaged, minimum, or maximum) shares of predefined usage profiles ("profile shares") in an aggregated network load and/or processor load of the mobile network (in the example of the drawing, profile shares pertaining to the standard 5G profiles uRLLC, eMBB, mMTC) during the specified time interval; aggregated (e.g., averaged, minimum, or maximum) SLA fulfilments during the specified time interval pertaining to the usage profiles covered by the optimization reports; a number of optimization messages (e.g., commands controlling the optimization parameters on particular devices) sent during the specified time interval; an aggregated (e.g., averaged, minimum, or maximum) load of CPU processors within the scope of devices monitored by the transmitting network orchestrator during the specified time interval; and an aggregated (e.g., averaged, minimum, or maximum) load of GPU processors within the scope of devices monitored by the transmitting network orchestrator during the specified time interval. The optimization reports 400 may contain further information not shown in FIG. 4.

The table shows additional quantities that may be calculated automatically and included in the optimization reports 400 by the transmitting network orchestrator to reduce the processing load of the MEC orchestrator receiving the optimization reports 400, or may be calculated by the receiving MEC orchestrator to reduce the processing load of the network orchestrator transmitting the optimization reports 400. In the example of FIG. 4, possible additional quantities may be the change of SLA fulfilment since the previous optimization report, and the change in the number of sent optimization messages. The optimization reports 400 may contain further additional quantities not shown in FIG. 4, and/or further additional quantities may be derived from the data included in the optimization reports 400.

Changes or trends that may be observed in the optimization reports shown in FIG. 4, received within 15 minutes and covering a time span of 20 minutes, include observations typical of increasing optimization inefficiency, such as an increase of the share of ultra low latency (uRLLC) load from 60 to 63 percent in 15 minutes, a stagnation of the SLA fulfilment for the uRLLC profile on a comparably low level around 60 percent, an increase of the number of sent optimization messages by 20 percent from 1500 to 1800, a decrease of SLA fulfilment for the eMBB profile from 99 to 90 percent, an increase in CPU load from 75 to 83 percent, and an increase of GPU load from 50 to 72 percent. Depending on the particular metric-specific definitions of optimization efficiency, some or more of these trends may fulfil a metric-specific inefficiency criterion, which may result in fulfilment of a total inefficiency criterion aggregated from the metric-specific inefficiency criteria (e.g., using logical operators and/or formulas being functions of the optimization metrics). The determination of the current optimization efficiency may take into account trends that are detectable in the data of multiple subsequent, or not directly subsequent, optimization reports, including trends detectable based on two, three, four, five, or more subsequent optimization reports, and trends detectable based on every second, third, fourth, . . . optimization report.

FIG. 5 shows an exemplary set of deployment suggestions 500a to 500d. It is understood that deployment suggestions may be defined in various different ways not shown in FIG. 5, including different suggested variations of deployment parameters, different combinations of deployment parameters to be varied, and different deployment metrics or combinations thereof being taken into account for specifying an expected response to the suggested variations. Deployment suggestion 500a specifies a suggested variation of migrating execution of a portion of m out of a total number of n software applications currently running on a particular edge node (referred to as "edge 1") away from edge 1 to one or more other edge nodes and/or public cloud computing resources, in favour of a specific application X to be migrated to edge 1. Deployment suggestion 500a further specifies an expected response of 2 milliseconds (ms) reduced delay time for application X. Deployment suggestion 500b specifies a suggested variation of migrating execution of a portion of m out of n software applications away from edge 1, with an expected response of a delay reduction by 3 ms for the n−m applications remaining on edge 1. Deployment suggestion 500c specifies a suggested variation of migrating execution of a particular application X from edge 1 to another edge node, the expected response being a general delay reduction by 1 ms for edge 1. Deployment suggestion 500d specifies a suggested variation of migrating a portion of user connections pertaining to a specific application X running on a specific edge node to another instance of X that is running on a cloud node. Deployment suggestion 500d further specifies several expected responses to the suggested variation: A full reduction of the CPU load of a particular CPU or CPU core of edge 1 (which may be represented by a corresponding reduction of the overall CPU load of edge 1 if edge 1 is a multi-processor node); an increase of latency by 5 ms for the migrated user connections; and a decrease of latency by 2 ms for those user connections that were not migrated away from edge 1.

Figure 6:
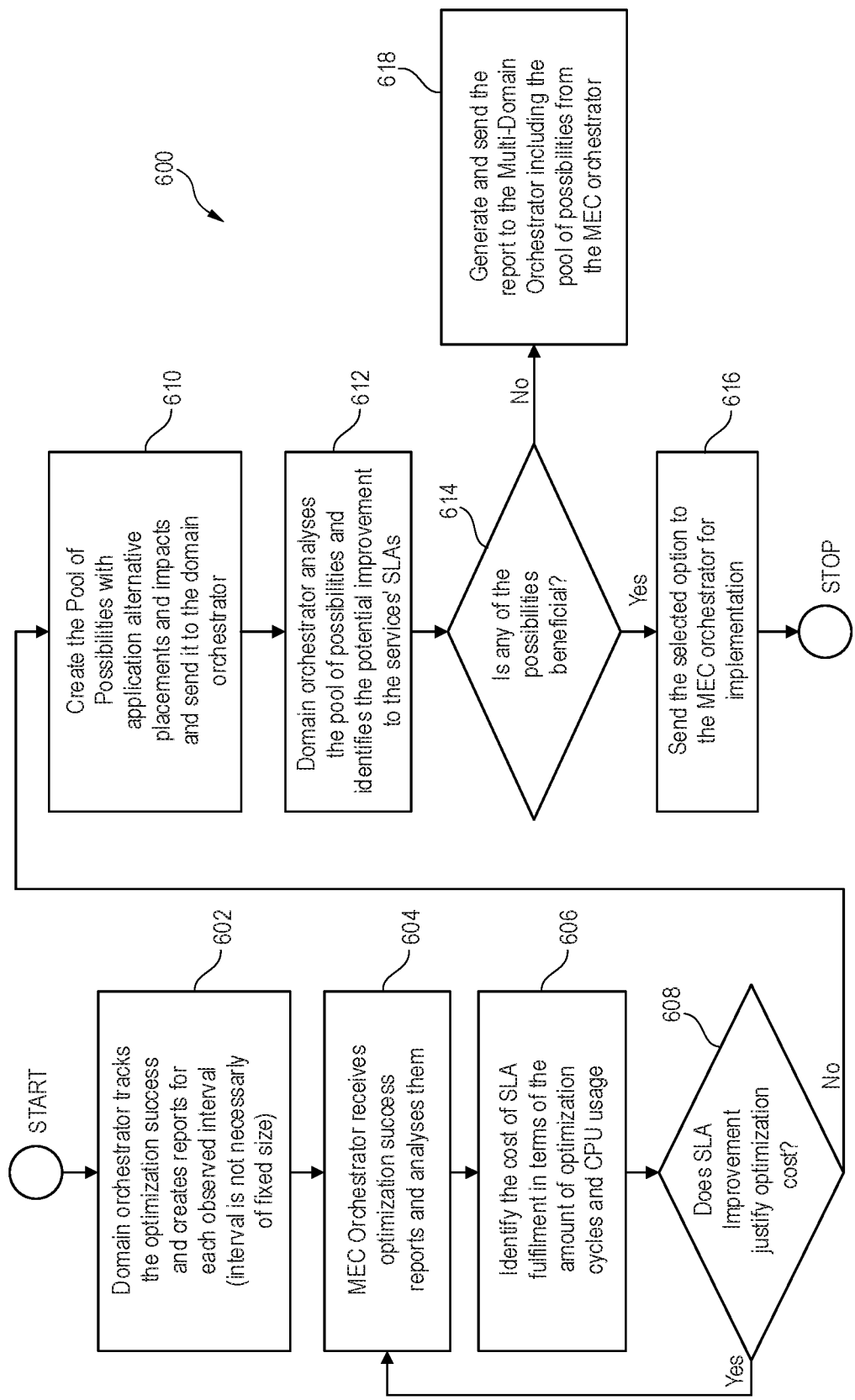
FIG. 6 depicts a flow diagram of steps of coordinating edge computing in a mobile network.

FIG. 6 depicts a flow diagram illustrating exemplary steps that may be carried out in the course of a method 600 of coordinating edge computing in a mobile network. It has to be noted that the diagram of FIG. 6 shows numerous specific choices for features that are defined herein in more general terms. For instance, the optimization efficiency does not necessarily have to be based on the particular optimization metrics SLA fulfilment, amount of optimization cycles, and CPU usage shown in FIG. 6.

The method starts with a step 602 where a network orchestrator tracks the successful performance of optimization tasks by monitoring optimization metrics related to the optimization tasks, generates an optimization report based on the optimization metrics and transmits the optimization report to an MEC orchestrator. The optimization report is indicative of the optimization metrics within a time interval covered by the optimization report, wherein the time interval does not necessarily have to be constant. In step 604, the MEC orchestrator receives the optimization report from the network orchestrator and starts analysing it, optionally together with one or more earlier optimization reports received from the network orchestrator, by performing the subsequent steps 606 and 608.

In step 606, the MEC orchestrator determines an optimization efficiency based on the considered optimization reports. In the example of FIG. 6, the optimization efficiency is referred to as a cost figure weighing a degree of fulfilment of a service level agreement to be realized by the mobile network (SLA fulfilment) against an expense of resources measured in terms of CPU load and of a number of performed optimization cycles (represented, e.g., by a number of transmitted optimization messages). In step 608, the MEC orchestrator determines whether the optimization efficiency fulfils a predefined inefficiency criterion that, in the example of FIG. 6, reflects whether an achieved change of SLA fulfilment justifies the expense of processing and network resources.

If the inefficiency criterion is not fulfilled (which would be true in the example of FIG. 6 if the achieved SLA improvement justifies the cost in terms of resource consumption), the method reverts to step 604. If the inefficiency criterion is fulfilled (which would be true in the example of FIG. 6 if the achieved SLA improvement does not justify the cost in terms of resource consumption), the method continues with step 610.

In step 610, the MEC orchestrator generates a set of deployment suggestions specifying suggested variations of deployment parameters and respective expected responses of deployment metrics to these variations ("impacts"). In the example of FIG. 6, deployment suggestions include migration of execution of instances of software applications to and/or away from particular edge nodes. The MEC orchestrator transmits the set of deployment suggestions (referred to in FIG. 6 as "Pool of Possibilities") to the network orchestrator.

In step 612, the network orchestrator receives the set of deployment suggestions from the MEC orchestrator and tries to determine which of the deployment suggestions yields a significant support of its optimization tasks. For that purpose, the network orchestrator determines a possible effect of the suggested variations and/or the expected responses of the corresponding deployment metrics on the optimization metrics. In the example of FIG. 6, such support is represented by an improvement (increase) of the SLA fulfilment. This aggregate SLA fulfilment may be determined based on atomic SLA fulfilments of different services provided by the mobile network.

If the network orchestrator identifies 614 one or more deployment suggestions that may give a significant support to its optimization tasks, it selects these supporting suggestions and reports 616 to the MEC orchestrator which deployment suggestions have been selected, using, e.g., identifiers of the selected suggestions. In this case, the MEC orchestrator continues step 616 by implementing the suggested variations of the selected suggestions.

In the example of FIG. 6, the network orchestrator continues with step 618 if the identification 614 of a selected suggestion is not possible. In step 618, the network orchestrator generates a selection report that contains the set of deployment suggestions and the analysis results of the deployment suggestions by the network orchestrator and sends the selection report to a multi-domain orchestrator. Taking into account the information collected in the selection report and internal information available to the multi-domain orchestrator, the multi-domain orchestrator may identify one or more selected suggestions from the set of deployment suggestions and report the selected suggestions to the MEC orchestrator directly or via the network orchestrator.

Multiple alternatives can be envisaged for the case of a unsuccessful identification 614 of a selected suggestion by the network orchestrator. In an example, the network orchestrator may be configured to do nothing in case of an unsuccessful identification 614, which may enable waiting for better deployment suggestions in possible future sets of deployment suggestions. In an example, the network orchestrator may be configured to always select at least one of the deployment suggestions (e.g., selecting the deployment suggestion with the most pronounced beneficial effect on the optimization tasks), which may enable to make use of the possibility that the effects of the selected suggestion may turn out better in reality than expected by the network orchestrator. In an example, the network orchestrator may be configured to forward the set of deployment suggestions or the selection report to another network orchestrator that is not a multi-domain orchestrator (e.g., the second network orchestrator). This may enable to make use of the possibility that the other network orchestrator may be more successful in identifying a selected suggestion that provides significant support for its own optimization tasks. In this case, the other network orchestrator may report the selected suggestions to the MEC orchestrator directly or via the (first) network orchestrator.

In the following, the invention will be described again by a list of clauses highlighting several possible, non-exclusive combinations of features disclosed herein:

1. A method of coordinating edge computing in a mobile network, the method comprising, by a multi-access edge computing, MEC, orchestrator operating on the mobile network:
    monitoring deployment metrics and controlling deployment parameters, the deployment metrics and the deployment parameters being related to a deployment of software applications on edge nodes of the mobile network;
    receiving an optimization report from a network orchestrator of the mobile network;
    based on the optimization report, determining a current optimization efficiency of the mobile network;
    if the optimization efficiency fulfils a predefined inefficiency criterion:
        determining a set of deployment suggestions, each deployment suggestion having assigned one or more of the deployment parameters and being indicative of an expected response of one or more of the deployment metrics to a suggested variation of the one or more assigned deployment parameters; and
        transmitting the set of deployment suggestions to the network orchestrator;
    in response to receiving from the network orchestrator an indication of a selected suggestion selected from the set of deployment suggestions, applying the suggested variation of the one or more deployment parameters assigned to the selected suggestion.

2. The method of clause 1, the deployment metrics being selected from the group consisting of a latency experienced by one or more of the software applications, a number of the edge nodes available as hosts for the deployment of the software applications, a latency experienced by a user connected to the edge nodes, a network latency of one or more of the edge nodes, a processing load of one or more of the edge nodes, a network load of one or more of the edge nodes or of a communication link of the mobile network, a number of users connected to one or more of the edge nodes, a mobility of user connections between the edge nodes, a list of services available on one or more of the edge nodes, and a topology of the edge nodes within the mobile network.

3. The method of clause 1 or 2, the suggested variation of the one or more assigned deployment parameters being selected from the group consisting of an initialization of execution of one or more of the software applications by one of the edge nodes, a termination of execution of one or more of the software applications by one of the edge nodes, a migration of execution of one or more of the software applications to one or more of the edge nodes or a cloud computing resource, an adjustment of a rule or of a requirement for the deployment of one or more of the software applications, and a migration of a user connection pertaining to an instance of a given one of the software applications being executed by one of the edge nodes to an instance of the given software application being executed by another one of the edge nodes or by a cloud computing resource.
4. The method of any of the previous clauses, the optimization report being based on optimization metrics, the optimization efficiency being correlated to one or more of the optimization metrics selected from the group consisting of:
   a degree of fulfilment of a service level agreement, SLA fulfilment, realized by the mobile network, wherein fulfilment of the inefficiency criterion is correlated to a decrease, or a stagnation below a predefined minimum, of the SLA fulfilment;
   a processor load experienced by a processor working in the mobile network, wherein fulfilment of the inefficiency criterion is correlated to an increase, or a stagnation above a predefined maximum, of the processor load;
   a network load experienced by a communication link of the mobile network, wherein fulfilment of the inefficiency criterion is correlated to an increase, or a stagnation above a predefined maximum, of the network load;
   a share of a predefined usage profile, profile share, in the processor load or the network load, wherein fulfilment of the inefficiency criterion is correlated to an increase, or a stagnation above a predefined maximum, of the profile share of a usage profile having a comparably high requirement of processing resources or network resources;
   a number of optimization cycles of repeated execution of an optimization task performed by the network orchestrator, the optimization metrics being related to the optimization task, wherein fulfilment of the inefficiency criterion is correlated to an increase, or a stagnation above a predefined maximum, of the number of optimization cycles;
   a number of optimization messages issued in the mobile network, wherein fulfilment of the inefficiency criterion is correlated to an increase, or a stagnation above a predefined maximum, of the number of optimization messages; and
   an optimization impact quantifying a successful performance of the optimization task, wherein fulfilment of the inefficiency criterion is correlated to a decrease, or a stagnation below a predefined minimum, of the optimization impact.
5. The method of any of the previous clauses, the set of deployment suggestions being determined from a set of deployment items, the deployment metrics and the deployment parameters being related to the deployment items, the determination of the set of deployment suggestions comprising:
   determining, for the deployment items, an expected response of one or more of the deployment metrics to a possible variation of one or more of the deployment parameters;
   ranking the set of deployment items by the expected response; and
   including the ranked deployment items as the deployment suggestions in the set of deployment suggestions according to a predefined cutoff criterion for the expected response, wherein the suggested variation of the one or more assigned deployment parameters is the possible variation of the one or more deployment parameters related to the corresponding deployment item.
6. The method of clause 5, the deployment items being selected from the group consisting of the software applications, different instances of one or more of the software applications, and user connections to one or more of the edge nodes.
7. A computer program product for coordinating edge computing in a mobile network, the computer program product comprising a computer readable storage medium having program instructions embodied therewith, the program instructions being executable by a computing device installed in or connected to the mobile network to cause the computing device to perform functions of an MEC orchestrator implementing the method of any of the previous clauses.
8. A computing device configured as an MEC orchestrator implementing the method of any of clauses 1-6.
9. A method of coordinating edge computing in a mobile network, the method comprising, by a first network orchestrator of the mobile network:
   performing a first optimization task within the mobile network and monitoring optimization metrics related to the first optimization task;
   transmitting an optimization report to a multi-access edge computing, MEC, orchestrator operating on the mobile network, the optimization report being based on the optimization metrics;
   receiving from the MEC orchestrator a set of deployment suggestions, each deployment suggestion having assigned deployment parameters and being indicative of an expected response of deployment metrics to a suggested variation of the assigned deployment parameters, the deployment metrics and the deployment parameters being related to a deployment of software applications on edge nodes of the mobile network;
   identifying from the set of deployment suggestions a selected suggestion providing a greatest extent of support for the first optimization task; and
   transmitting an indication of the selected suggestion to the MEC orchestrator for applying the suggested variation of the deployment parameters assigned to the selected suggestion.
10. The method of clause 9, the first network orchestrator being selected from the group consisting of a near-real-time radio access network intelligent controller, near-RT RIC; a non-real-time radio access network intelligent controller, non-RT RIC; a transport layer orchestrator; and a cloud computing orchestrator.
11. The method of clause 9 or 10, the first network orchestrator performing the first optimization task within a first optimization domain of the mobile network, the mobile network further comprising a second network orchestrator performing a second optimization task within a second optimization domain of the mobile network, the mobile network further comprising a multi-domain orchestrator controlling the performance of the first optimization task by the first network orchestrator and the performance of the second optimization task by the second network orchestrator, the identification of the selected suggestion comprising, in case the first network orchestrator is unable to determine the greatest extent of support for the first optimization task, forwarding the set of deployment suggestions to the multi-domain orchestrator and receiving the indication of the selected suggestion from the multi-domain orchestrator.

12. The method of any of clauses 9-11, the optimization metrics being selected from the group consisting of:
   a degree of fulfilment of a service level agreement realized by the mobile network;
   a processor load experienced by a processor working in the mobile network;
   a network load experienced by a communication link of the mobile network;
   a share of a predefined usage profile in the processor load or the network load;
   a number of optimization cycles of repeated execution of the optimization task;
   a number of optimization messages issued in the mobile network; and
   an optimization impact quantifying a successful performance of the optimization task.

13. The method of any of clauses 9-12, the identification of the selected suggestion comprising determining an expected response of the optimization metrics to the expected response of the deployment metrics indicated by the deployment suggestions, and selecting the selected suggestion from the deployment suggestions according to a fulfilment of a predefined selection criterion by the expected response of the optimization metrics.

14. A computer program product for coordinating edge computing in a mobile network, the computer program product comprising a computer readable storage medium having program instructions embodied therewith, the program instructions being executable by a computing device installed in the mobile network to cause the computing device to perform functions of a network orchestrator implementing the method of any of clauses 9-13.

15. A computing device configured as a network orchestrator implementing the method of any of clauses 9-13.

16. A system for providing edge computing in a mobile network, the system comprising a computing device installed in the mobile network and configured as a first network orchestrator, the system further comprising a computing device installed in or connected to the mobile network and configured as a multi-access edge computing, MEC, orchestrator, the system being configured for performing a method comprising:
   by the first network orchestrator:
      performing a first optimization task within the mobile network and monitoring optimization metrics related to the first optimization task;
      transmitting an optimization report to the MEC orchestrator, the optimization report being based on the optimization metrics;
   by the MEC orchestrator:
      monitoring deployment metrics and controlling deployment parameters, the deployment metrics and the deployment parameters being related to a deployment of software applications on edge nodes of the mobile network;
      receiving the optimization report from the first network orchestrator;
      based on the optimization report, determining a current optimization efficiency of the mobile network;
      if the optimization efficiency fulfils a predefined inefficiency criterion:
         determining a set of deployment suggestions, each deployment suggestion having assigned one or more of the deployment parameters and being indicative of an expected response of one or more of the deployment metrics to a suggested variation of the one or more assigned deployment parameters;
         transmitting the set of deployment suggestions to the first network orchestrator;
   by the first network orchestrator in response to receiving the set of deployment suggestions from the MEC orchestrator:
      identifying from the set of deployment suggestions a selected suggestion providing a greatest extent of support for the first optimization task;
      transmitting an indication of the selected suggestion to the MEC orchestrator;
   by the MEC orchestrator in response to receiving the indication of the selected suggestion from the first network orchestrator, applying the suggested variation of the one or more deployment parameters assigned to the selected suggestion.

17. The system of clause 16, the first network orchestrator performing the first optimization task within a first optimization domain of the mobile network, the system further comprising a computing device installed in the mobile network and configured as a second network orchestrator performing a second optimization task within a second optimization domain of the mobile network, the system further comprising a computing device installed in the mobile network and configured as a multi-domain orchestrator controlling the performance of the first optimization task by the first network orchestrator and the performance of the second optimization task by the second network orchestrator, the identification of the selected suggestion comprising, in case the first network orchestrator is unable to determine the greatest extent of support for the first optimization task, forwarding the set of deployment suggestions to the multi-domain orchestrator and receiving the indication of the selected suggestion from the multi-domain orchestrator, the method further comprising, by the multi-domain orchestrator upon receiving the set of deployment suggestions from the first network orchestrator, identifying from the set of deployment suggestions the selected suggestion providing a greatest extent of support for the first optimization task and the second optimization task, and transmitting the indication of the selected suggestion to the first network orchestrator.

18. A method of coordinating edge computing in a mobile network, the mobile network comprising a first network orchestrator performing a first optimization task within a first optimization domain of the mobile network, a second network orchestrator performing a second optimization task within a second optimization domain of the mobile network, and a multi-domain orchestrator controlling the performance of the first optimization task by the first network orchestrator and the performance of the second optimization task by the second network orchestrator, the method comprising, by the multi-domain orchestrator:
   receiving a set of deployment suggestions from the first network orchestrator, each deployment suggestion having assigned deployment parameters and being indicative of an expected response of deployment metrics to a suggested variation of the assigned deployment parameters, the deployment metrics and the deployment parameters being related to a deployment of software applications on edge nodes of the mobile network;
identifying from the set of deployment suggestions a selected suggestion providing a greatest extent of support for the first optimization task and the second optimization task; and transmitting an indication of the selected suggestion to the first network orchestrator.

19. A computer program product for coordinating edge computing in a mobile network, the computer program product comprising a computer readable storage medium having program instructions embodied therewith, the program instructions being executable by a computing device installed in the mobile network to cause the computing device to perform functions of a multi-domain orchestrator implementing the method of clause 18.

20. A computing device configured as a network orchestrator implementing the method of clause 18.

What is claimed is:

1. A method of coordinating edge computing in a mobile network, the method comprising, by a multi-access edge computing, MEC, orchestrator operating on the mobile network:
   monitoring deployment metrics and controlling deployment parameters, the deployment metrics and the deployment parameters being related to a deployment of software applications on edge nodes of the mobile network;
   receiving an optimization report from a network orchestrator of the mobile network;
   based on the optimization report, determining a current optimization efficiency of the mobile network;
   if the optimization efficiency fulfils a predefined inefficiency criterion:
      determining a set of deployment suggestions, each deployment suggestion having assigned one or more of the deployment parameters and being indicative of an expected response of one or more of the deployment metrics to a suggested variation of the one or more assigned deployment parameters; and
   transmitting the set of deployment suggestions to the network orchestrator; and
   in response to receiving from the network orchestrator an indication of a selected suggestion selected from the set of deployment suggestions, applying the suggested variation of the one or more deployment parameters assigned to the selected suggestion.

2. The method of claim 1, wherein the deployment metrics are selected from at least one of a latency experienced by one or more of the software applications, a number of the edge nodes available as hosts for the deployment of the software applications, a latency experienced by a user connected to the edge nodes, a network latency of one or more of the edge nodes, a processing load of one or more of the edge nodes, a network load of one or more of the edge nodes or of a communication link of the mobile network, a number of users connected to one or more of the edge nodes, a mobility of user connections between the edge nodes, a list of services available on one or more of the edge nodes, and a topology of the edge nodes within the mobile network.

3. The method of claim 1, wherein the suggested variation of the one or more assigned deployment parameters is selected from at least one of an initialization of execution of one or more of the software applications by one of the edge nodes, a termination of execution of one or more of the software applications by one of the edge nodes, a migration of execution of one or more of the software applications to one or more of the edge nodes or a cloud computing resource, an adjustment of a rule or of a requirement for the deployment of one or more of the software applications, and a migration of a user connection pertaining to an instance of a given one of the software applications being executed by one of the edge nodes to an instance of the given software application being executed by another one of the edge nodes or by a cloud computing resource.

4. The method of claim 1, wherein the optimization report is based on optimization metrics, the optimization efficiency being correlated to one or more of the optimization metrics selected from at least one of:
   a degree of fulfilment of a service level agreement, SLA fulfilment, realized by the mobile network, wherein fulfilment of the inefficiency criterion is correlated to a decrease, or a stagnation below a predefined minimum, of the SLA fulfilment;
   a processor load experienced by a processor working in the mobile network, wherein fulfilment of the inefficiency criterion is correlated to an increase, or a stagnation above a predefined maximum, of the processor load;
   a network load experienced by a communication link of the mobile network, wherein fulfilment of the inefficiency criterion is correlated to an increase, or a stagnation above a predefined maximum, of the network load;
   a share of a predefined usage profile, profile share, in the processor load or the network load, wherein fulfilment of the inefficiency criterion is correlated to an increase, or a stagnation above a predefined maximum, of the profile share of a usage profile having a comparably high requirement of processing resources or network resources;
   a number of optimization cycles of repeated execution of an optimization task performed by the network orchestrator, the optimization metrics being related to the optimization task, wherein fulfilment of the inefficiency criterion is correlated to an increase, or a stagnation above a predefined maximum, of the number of optimization cycles;
   a number of optimization messages issued in the mobile network, wherein fulfilment of the inefficiency criterion is correlated to an increase, or a stagnation above a predefined maximum, of the number of optimization messages; and
   an optimization impact quantifying a successful performance of the optimization task, wherein fulfilment of the inefficiency criterion is correlated to a decrease, or a stagnation below a predefined minimum, of the optimization impact.

5. The method of claim 1, wherein the set of deployment suggestions is determined from a set of deployment items, the deployment metrics and the deployment parameters being related to the deployment items, the determination of the set of deployment suggestions comprising:
   determining, for the deployment items, an expected response of one or more of the deployment metrics to a possible variation of one or more of the deployment parameters;
   ranking the set of deployment items by the expected response; and including the ranked deployment items as the deployment suggestions in the set of deployment suggestions according to a predefined cutoff criterion for the expected response, wherein the suggested variation of the one or more assigned deployment parameters is the possible variation of the one or more deployment parameters related to the corresponding deployment item.

6. The method of claim 5, wherein the deployment items are selected from at least one of software applications, different instances of one or more of the software applications, and user connections to one or more of the edge nodes.

7. A computer program product for coordinating edge computing in a mobile network, the computer program product comprising a computer readable storage medium having program instructions embodied therewith, the program instructions being executable by a computing device installed in or connected to the mobile network to cause the computing device to perform functions of an MEC orchestrator implementing a method of coordinating edge computing in a mobile network, the method comprising:
monitoring deployment metrics and controlling deployment parameters, the deployment metrics and the deployment parameters being related to a deployment of software applications on edge nodes of the mobile network;
receiving an optimization report from a network orchestrator of the mobile network;
based on the optimization report, determining a current optimization efficiency of the mobile network;
if the optimization efficiency fulfils a predefined inefficiency criterion:
determining a set of deployment suggestions, each deployment suggestion having assigned one or more of the deployment parameters and being indicative of an expected response of one or more of the deployment metrics to a suggested variation of the one or more assigned deployment parameters; and
transmitting the set of deployment suggestions to the network orchestrator; and
in response to receiving from the network orchestrator an indication of a selected suggestion selected from the set of deployment suggestions, applying the suggested variation of the one or more deployment parameters assigned to the selected suggestion.

8. The computer program product of claim 7, wherein the first network orchestrator is selected from at least one of a near-real-time radio access network intelligent controller, near-RT RIC; a non-real-time radio access network intelligent controller, non-RT RIC; a transport layer orchestrator; and a cloud computing orchestrator.

9. The computer program product of claim 7, the method further comprising:
the first network orchestrator performing the first optimization task within a first optimization domain of the mobile network, the mobile network further comprising a second network orchestrator performing a second optimization task within a second optimization domain of the mobile network, the mobile network further comprising a multi-domain orchestrator controlling the performance of the first optimization task by the first network orchestrator and the performance of the second optimization task by the second network orchestrator, the identification of the selected suggestion comprising, in case the first network orchestrator is unable to determine the greatest extent of support for the first optimization task, forwarding the set of deployment suggestions to the multi-domain orchestrator and receiving the indication of the selected suggestion from the multi-domain orchestrator.

10. The computer program product of claim 7, wherein the optimization metrics are selected from at least one of:
a degree of fulfilment of a service level agreement realized by the mobile network;
a processor load experienced by a processor working in the mobile network;
a network load experienced by a communication link of the mobile network;
a share of a predefined usage profile in the processor load or the network load;
a number of optimization cycles of repeated execution of the optimization task;
a number of optimization messages issued in the mobile network; and
an optimization impact quantifying a successful performance of the optimization task.

11. The computer program product of claim 7, wherein the identification of the selected suggestion further comprises:
determining an expected response of the optimization metrics to the expected response of the deployment metrics indicated by the deployment suggestions, and selecting the selected suggestion from the deployment suggestions according to a fulfilment of a predefined selection criterion by the expected response of the optimization metrics.

12. A system for providing edge computing in a mobile network, the system comprising a computing device installed in the mobile network and configured as a first network orchestrator, the system further comprising a computing device installed in or connected to the mobile network and configured as a multi-access edge computing, MEC, orchestrator, the system being configured for performing a method comprising:
by the first network orchestrator:
performing a first optimization task within the mobile network and monitoring optimization metrics related to the first optimization task;
transmitting an optimization report to the MEC orchestrator, the optimization report being based on the optimization metrics;
by the MEC orchestrator:
monitoring deployment metrics and controlling deployment parameters, the deployment metrics and the deployment parameters being related to a deployment of software applications on edge nodes of the mobile network;
receiving the optimization report from the first network orchestrator;
based on the optimization report, determining a current optimization efficiency of the mobile network;
if the optimization efficiency fulfils a predefined inefficiency criterion:
determining a set of deployment suggestions, each deployment suggestion having assigned one or more of the deployment parameters and being indicative of an expected response of one or more of the deployment metrics to a suggested variation of the one or more assigned deployment parameters;
transmitting the set of deployment suggestions to the first network orchestrator;
by the first network orchestrator in response to receiving the set of deployment suggestions from the MEC orchestrator:

identifying from the set of deployment suggestions a selected suggestion providing a greatest extent of support for the first optimization task;
transmitting an indication of the selected suggestion to the MEC orchestrator; and
by the MEC orchestrator, in response to receiving the indication of the selected suggestion from the first network orchestrator, applying the suggested variation of the one or more deployment parameters assigned to the selected suggestion.

13. The system of claim 12, the method further comprising:
the first network orchestrator performing the first optimization task within a first optimization domain of the mobile network, the system further comprising a computing device installed in the mobile network and configured as a second network orchestrator performing a second optimization task within a second optimization domain of the mobile network, the system further comprising a computing device installed in the mobile network and configured as a multi-domain orchestrator controlling the performance of the first optimization task by the first network orchestrator and the performance of the second optimization task by the second network orchestrator, the identification of the selected suggestion comprising, in case the first network orchestrator is unable to determine the greatest extent of support for the first optimization task, forwarding the set of deployment suggestions to the multi-domain orchestrator and receiving the indication of the selected suggestion from the multi-domain orchestrator, the method further comprising, by the multi-domain orchestrator upon receiving the set of deployment suggestions from the first network orchestrator, identifying from the set of deployment suggestions the selected suggestion providing a greatest extent of support for the first optimization task and the second optimization task, and transmitting the indication of the selected suggestion to the first network orchestrator.

* * * * *